(12) United States Patent
Hamed

(10) Patent No.: US 11,479,323 B2
(45) Date of Patent: Oct. 25, 2022

(54) AUTOMATIC BICYCLE SHIFTER AND SHIFTING CABLE ACTUATOR

(71) Applicant: Hazem Nihad Hamed, Huntington Beach, CA (US)

(72) Inventor: Hazem Nihad Hamed, Huntington Beach, CA (US)

(*) Notice: Subject to any disclaimer, the term of this patent is extended or adjusted under 35 U.S.C. 154(b) by 0 days.

(21) Appl. No.: 17/367,636

(22) Filed: Jul. 6, 2021

(65) Prior Publication Data

US 2021/0331767 A1 Oct. 28, 2021

(51) Int. Cl.
*B62M 25/08* (2006.01)
*B62M 25/02* (2006.01)
*B62M 25/00* (2006.01)

(52) U.S. Cl.
CPC ............ *B62M 25/02* (2013.01); *B62M 25/08* (2013.01); *B62M 2025/006* (2013.01)

(58) Field of Classification Search
CPC ...... B62M 25/08; B62M 25/02; B62M 9/122; B62M 9/123; B62M 9/132; B62M 9/133
See application file for complete search history.

(56) References Cited

U.S. PATENT DOCUMENTS

| 5,178,033 A * | 1/1993 | Kund | B62J 11/13 74/489 |
|---|---|---|---|
| 5,514,041 A * | 5/1996 | Hsu | B62M 25/08 474/78 |
| 5,599,244 A * | 2/1997 | Ethington | B62M 9/123 474/81 |
| 5,873,283 A * | 2/1999 | Chen | B62M 25/08 192/142 R |
| 11,077,908 B1* | 8/2021 | Hamed | H04W 4/80 |
| 2008/0114519 A1* | 5/2008 | DuFaux | B60T 7/16 701/70 |
| 2009/0191994 A1* | 7/2009 | Takamoto | B62M 9/122 474/70 |
| 2012/0035011 A1* | 2/2012 | Menachem | B62M 9/122 474/122 |
| 2018/0127058 A1* | 5/2018 | Rodgers | B62M 9/122 |
| 2019/0225118 A1* | 7/2019 | Tindall | B60N 2/067 |
| 2019/0233054 A1* | 8/2019 | Rodgers | B62M 9/122 |
| 2019/0249769 A1* | 8/2019 | Hamed | F16H 63/42 |
| 2019/0263474 A1* | 8/2019 | Hamed | B62M 9/123 |
| 2019/0351971 A1* | 11/2019 | Dueweling | B62M 9/122 |
| 2019/0368237 A1* | 12/2019 | Distefano | E05B 81/46 |
| 2020/0189688 A1* | 6/2020 | Rodgers | F16C 1/16 |
| 2020/0216144 A1* | 7/2020 | Hamed | B62K 23/06 |
| 2020/0283095 A1* | 9/2020 | Nichols | F16H 25/20 |
| 2022/0119075 A1* | 4/2022 | Hamed | B62M 9/122 |

* cited by examiner

*Primary Examiner* — Brian J McGovern

(57) ABSTRACT

An automatic bicycle shifter making use of a sheathed cable actuator utilizing a pulley arrangement to energize actuation cable thereof with high adaptability to single and double cable arrangement devices and provided with a gearbox employing a worm gearset for positive retention of actuated position and an encoder for accurate and programmable operation.

18 Claims, 13 Drawing Sheets

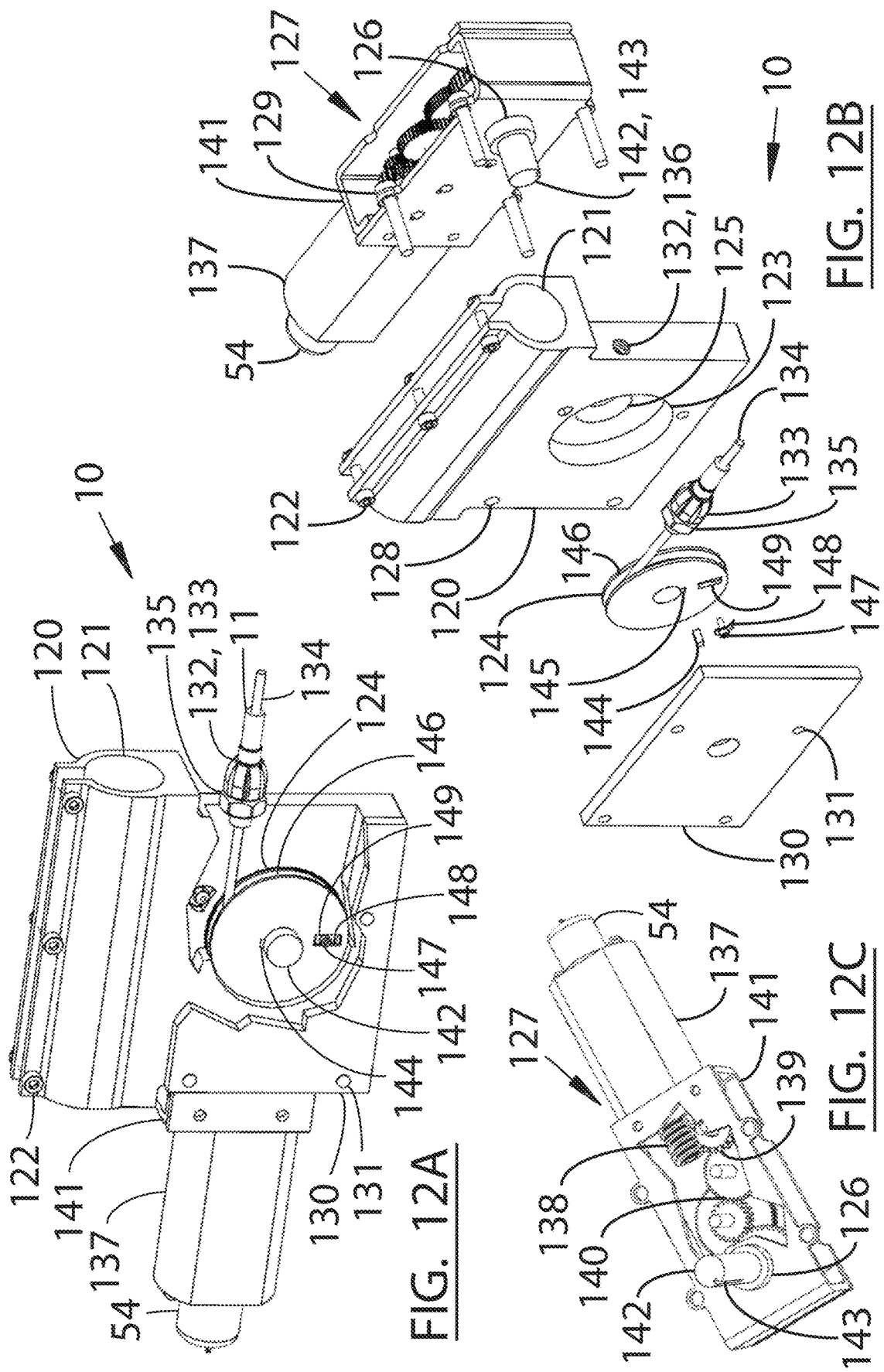

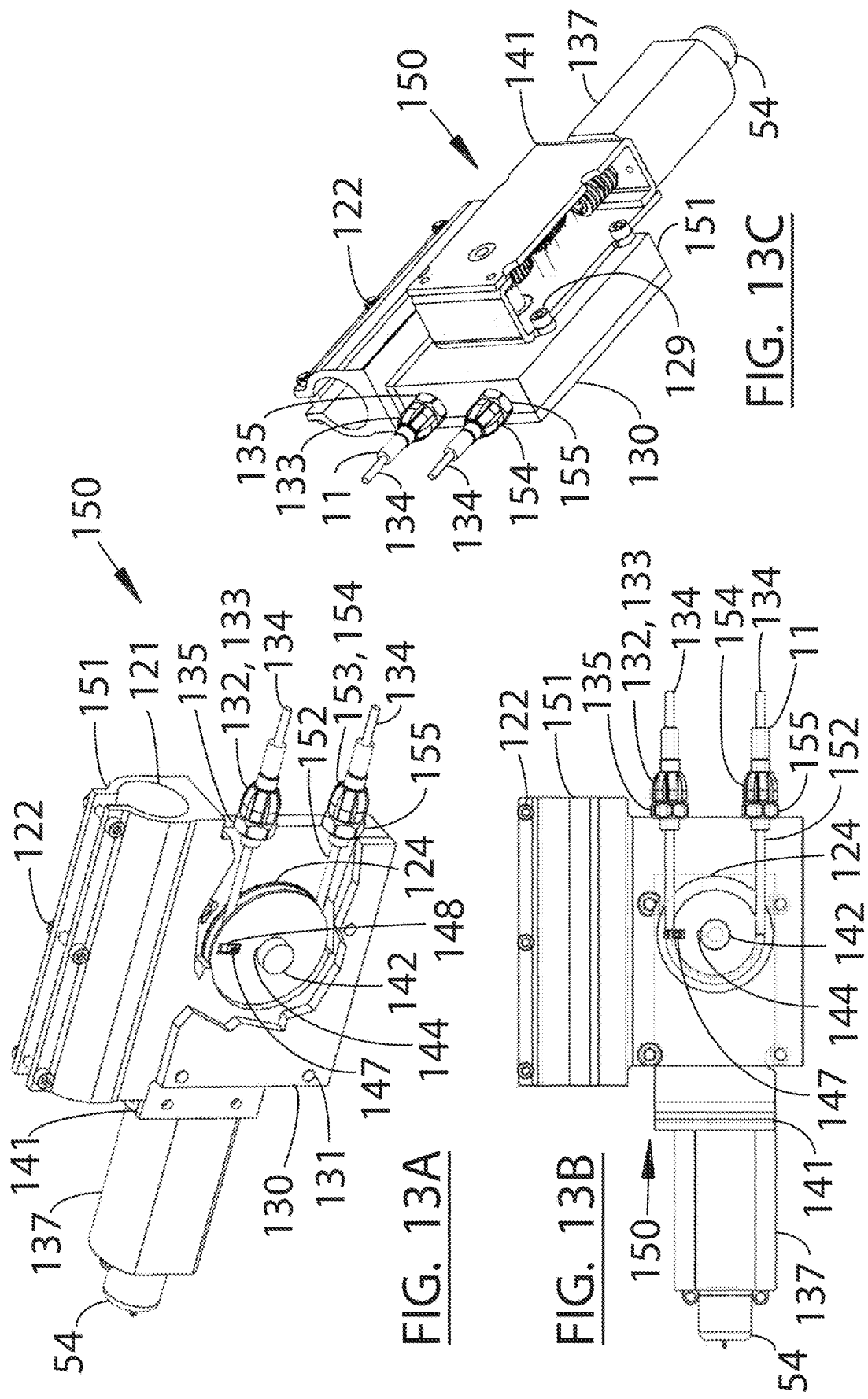

AUTOMATIC BICYCLE SHIFTER AND SHIFTING CABLE ACTUATOR

| CROSS-REFERENCE TO RELATED APPLICATIONS | Not Applicable |
|---|---|
| FEDERALLY SPONSORED RESEARCH | Not Applicable |
| SEQUENCE LISTING OR PROGRAM | Not Applicable |

FIELD OF THE INVENTION

The disclosed invention relates to the cycling transportation and sporting industry, specifically to modern bicycle designs typically making use of a gearing or sprockets based powertrain configurations permitting the rider to achieve an optimal drivetrain ratio thereby facilitating a comfortable pedaling rates and efforts thereof depending on rider preference for road speed, rider conditioning, road inclination, acceleration, wind load and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or has to alternate the pedals at an uncomfortably high rate to achieve desired riding speed, a need was recognized for multiple powertrain ratios to facilitate acceptable pedaling rates and efforts. A de-facto four bar linkage shifting mechanism subsequently emerged comprising additional power transmission sprockets of various number of teeth added in the axial directions of the pedals mechanism as well as power transmission rear wheel along with an integral chain tensioning apparatus and a set of rider lever based sheathed cable actuation mechanisms permitting selection of desired combinations of front and rear drive sprockets to suit road condition, rider biometrics and preference. Advancements in the actuation mechanism included indexing capability of the operator lever assembly so that the actuation of the sprocket alternation mechanism takes place in an indexing fashion consistently properly aligning the chain with desired sprocket thereof rather than one continuous motion requiring the rider to guess the proper chain position often leading to positioning errors. With the fundamental disadvantage of the de-facto derailleur design inability to shift during stoppage, a variety of designs replacing the derailleur assembly with gearing based power transmissions, some integrated internally into the bicycle rear hub and others incorporated at or near the bicycle pedaling assembly, consequently evolved thereby providing the rider with the same power transmission shifting capability through the same sheathed cable shifting apparatuses in a more self-contained and sealed package which the rider could shift at will without the otherwise necessary bicycle pedaling motion.

Other but less successful attempts in the evolution of the conventional bicycle design was the technology to automate the power transmission shift operation thereby relieving the rider of the constant manual shifting task. Numerous attempts have been made over many years to provide a robust yet commercially successful product. Some were attempts sacrificing robust componentry for cost, tight packaging and commerciality, while others were based on complex mathematical or fixed criteria based on "one for all" approaches. All ultimately achieving varying levels of success but uniformly falling short of meeting widespread commercial acceptance. On the fundamental level, most of these offerings had in common the failure to recognize that acceptance of these various designs ultimately boiled down to adaptability by a user population widespread in biometrics, endurance, strength and other personal attributes.

The inventor hereby discloses an electrically powered shifting apparatus for automatic control of the powertrain ratio of the bicycle in order to relieve the rider of manual shifting tasks through servo motor based shifter actuation, a robust microprocessor based logic control system making use of various speed, controls, a hot wire anemometer for measuring wind speed, an accelerometer for measuring acceleration, and a Global Positioning System (GPS) with location altitude output capability, all seamlessly integrated around an advanced user interface with capability to learn and store shifting behavior of the rider which, through either a predefined or a continually available learning period for the microprocessor based control system, serves to dispatch learned behavior thereof upon demand, thereby placing the bicycle powertrain in an optimal shift position on a consistent basis in order to facilitate acceptable pedaling rates and suitable efforts, all based on exacting criteria for rider biometrics, capability and needs.

Disclosure further outlines a novel approach for road inclination, frontal wind speed and bicycle acceleration compensation rooted in recording of nominal torques, accelerations and efforts governing the rider shifting behavior preferably under standard level road surface, low wind and normal acceleration but also possible under any inclination, acceleration and wind speed conditions and through application of on classical mechanics law of conservation of energy, seek to attenuate or appreciate the shifting speed in order to maintain an equivalent effort during shifting under varying road inclinations, wind loads and accelerations, and further refine the computed shifting criteria through additionally recording actual rider shifting behavior under these circumstances and adjust the computed shifting criteria to suit. Rider is additionally offered means to control the amount of compensation applied by the shifting algorithm through a simple level bar on the user interface.

DISCUSSION OF PRIOR ART

The following is a brief summary of prior art deemed pertinent to the automatic bicycle shifter user and learn user interface of the present invention.

U.S. Pat. No. 10,640,171 B2 proposes a design for alleviating the bicycle rider from the demanding task of continually seeking an acceptable shift setting. Although proposed design presents an effective solution highly adaptable by the rider to this challenging problem, it falls short of outlining capability to learn the shifting pattern of the rider and fine tune and continually improve the automatic shifting presets for the rider.

U.S. Pat. No. 10,167,056 B2 discloses a bicycle transmission control apparatus making use of various sensors and using a complex algorithm for automatically shifting a bicycle drive train. Notwithstanding the endeavor in the art, this approach does not take into account the rider metrics or conditioning and is therefore likely to fall short of achieving the intended objective.

U.S. Pat. No. 9,975,603 B2 discloses a bicycle transmission control apparatus making use of various sensors including a rider heart rate monitor and using a complex algorithm for automatically shifting a bicycle drive train. Notwithstanding the endeavor in the art, although this approach does partially take into account the rider conditioning it falls short of other important physical limitations like gender, strength and weight.

U.S. Pat. No. 9,284,018 B2 discloses another bicycle transmission control apparatus geared toward application of an inclination sensor and uses a simplified algorithm for automatically shifting a bicycle drive train. Notwithstanding the endeavor in the art, this approach does not take into account a multitude of parameters that impact viability of automatic shifting and therefore sure to fall short of intended objective.

U.S. Pat. No. 9,234,580 discloses a control device for a bicycle automatic transmission comprising an entailed computation algorithm based traveling resistance computed with readings of torque measurements, cadence or pedaling rate, bicycle speed and mass of bicycle and rider. As this approach is fundamentally based on assuming that two riders with the same weight but with significantly different muscles to fat ratios have synonymous abilities, the end result that this approach is likely to yield seems to be less than optimal. This disclosure, additionally falls short of providing a bicycle shifting criteria highly adaptable by the rider devoid of any complex mathematical calculations destined to fall short of providing riders an adequate result.

BRIEF SUMMARY OF THE INVENTION

Applicant discloses means for achieving the highly desirable option of relieving the bicycle rider of the drivetrain shifting tasks through equipping the bicycle shifter mechanism with a servo power actuation device governed by a microprocessor based electronic control system comprising a bicycle speed, acceleration, wind load, and a road location inclination sensor to proactively manage in real time powertrain shifting criteria based on operator shifting behavior through a predefined learning period or optionally, in a continually improving manner resulting in an optimal and automatically selected drive operation ratio in order to facilitate acceptable pedaling rates and efforts to suit rider preference.

The preferred embodiment of the automatic bicycle shifter and shifting cable actuator of the present invention, slaved thereof to an electric servo motor actuated shifting mechanism controlled by a comprehensive microprocessor-based controls system additionally making use of a bicycle speed sensor, a forward motion accelerometer, a wind speed hot wire anemometer, a Global Positioning System (GPS) device with altitude feedback capability and a motor power amplifier, and presented to the rider on a touchscreen display permitting the rider to teach the control system his or her shifting behavior through operation of the bicycle in a mode where the rider manually operates the shifting controls over a predefined period of time, or optionally placing the user interface a continually updating mode, serves to precisely fine tune shifting presets of the bicycle powertrain to rider preference, thereby proactively predicting and automatically conducting the desired bicycle shift actions on the riders behalf.

With the proposed bicycle controls philosophy being directly applicable to geared powertrain bicycles, inventor extends the controls definition of the proposed automatic bicycle shifter user interface of the present invention to suit operation of shifting cable derailleur based bicycles by additionally redefining the rider controls to teach the bicycle electronic control system a set of predefined shift combinations of the front and rear derailleurs thereby reducing the shift operation to a single controls action governing both derailleurs thereof and permitting the proposed learn user interface to learn rider shifting behavior over a prespecified period of time or optionally on a constantly updating basis in order to proactively manage the bicycle shift combinations for the rider automatically on a consistent basis, and thereby providing the same functionality proposed for geared powertrain bicycles.

As rider comfort is a continually moving target based on the rider condition often governed by traveled distance, conditioning, road and weather conditions, the automatic bicycle shifter and shifting cable actuator of the present invention is grants the rider the ability to define a number of shifting programs each geared toward a certain riding function such as racing, traveling, cruising or riding with a group. Means to continually adjust the bicycle shifting criteria with ease is additionally offered through slide touch controls realizing ability to proportionately adjust shifting speeds up or down.

With one of the most challenging aspects of automatic control of the bicycle being the ability to sense and govern shifting action under varying road inclination, acceleration and wind load conditions, inventor proposes a novel approach rooted in mathematical computation of the climbing effort component of the classical mechanics law of conservation of energy for the effort being applied by the rider. Control logic thereof based on overall riding mass and profile combined with explicit shifting data points the rider enters when he or she actuates the shifter in a "Learn Mode" during varying condition thereof interpolated and extrapolated, are used as basis to pre-emptively control the shifting speed combinations to account for road inclination, acceleration and varying wind load conditions.

Additionally, applicant discloses the novel approach of inclination compensation based on data received from a Global Positioning System (GPS) through "look ahead" of a number of altitude data points based on rider speed used as a basis for application proper amount of road inclination compensation to the shifting apparatus. It is additionally incumbent that road inclination compensation be explicitly invoked by the rider through a simple manual on/off button permitting the rider to explicitly enable or disable road inclination compensation.

BRIEF DESCRIPTION OF THE DRAWINGS

FIG. 12A is a perspective view of the novel shifting cable servo actuator of preferred and alternate embodiments of the automatic bicycle shifter and shifting cable actuator of the present invention.

FIG. 12B is an exploded view of the novel shifting cable servo actuator of the preferred and alternate embodiments of the automatic bicycle shifter and shifting cable actuator of the present invention.

FIG. 12C is perspective view of the preferred servo gearbox of the actuator of the preferred and alternate embodiments of the automatic bicycle shifter and shifting cable actuator of the present invention FIG. 13A is a perspective view of the novel double shifting cable servo actuator of the preferred and alternate embodiments of the automatic bicycle shifter and shifting cable actuator of the present invention.

FIG. 13B is a side view of the novel double shifting cable servo actuator of the preferred and alternate embodiments of the automatic bicycle shifter and shifting cable actuator of the present invention.

FIG. 13C is an oblique view of the novel double shifting cable servo actuator of the preferred and alternate embodiments of the automatic bicycle shifter and shifting cable actuator of the present invention.

DETAILED DESCRIPTION OF THE INVENTION

Preferred Embodiment Construction—FIGS. 1-4

Figure 1:
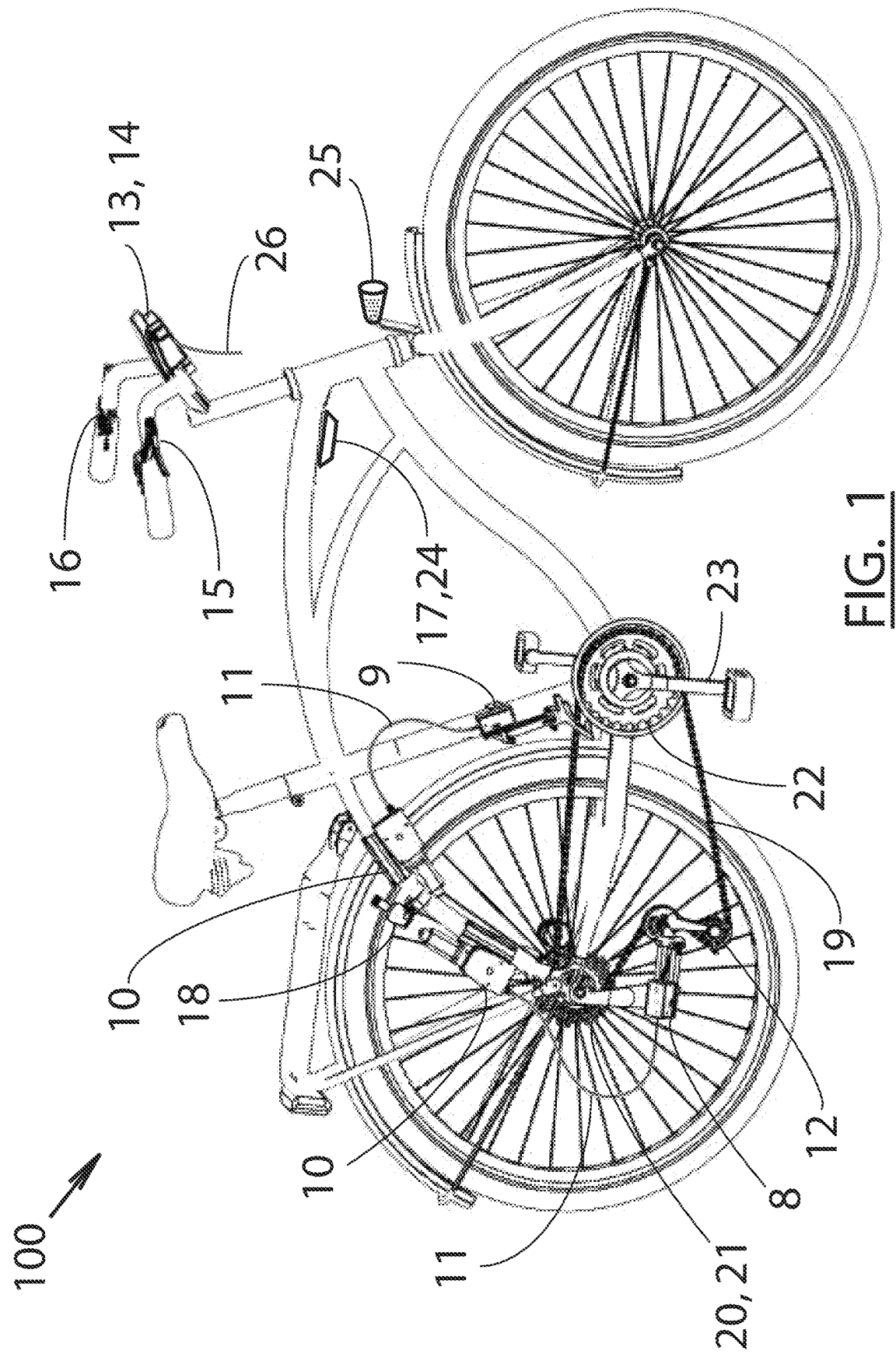
FIG. 1 is a perspective overall view of the systems and components comprising the preferred embodiment of the automatic bicycle shifter and shifting cable actuator of the present invention.
Figure 2:
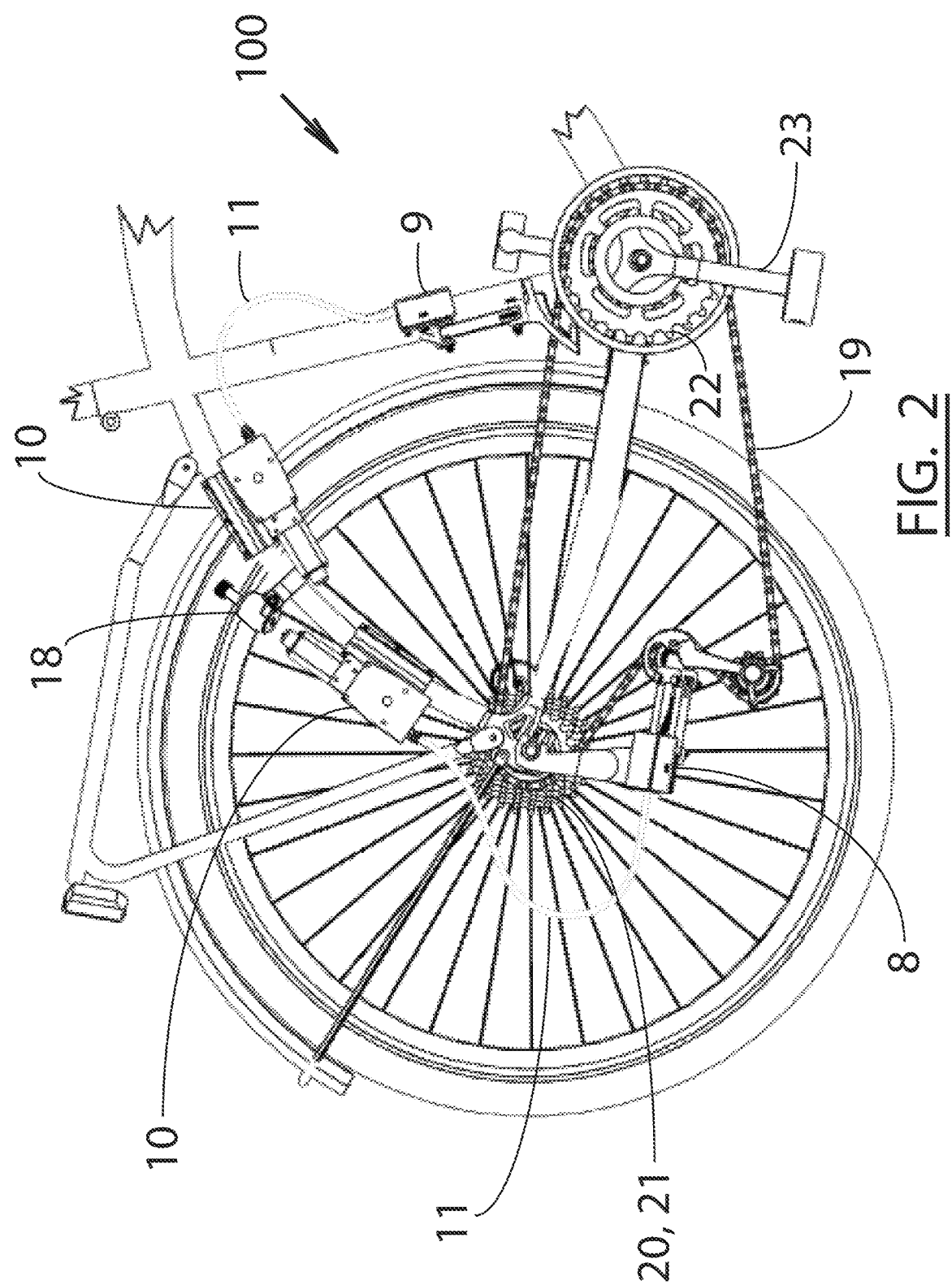
FIG. 2 is a perspective view of the power transmission apparatus of the preferred embodiment of the automatic bicycle shifter and shifting cable actuator of the present invention.
Figure 3A:
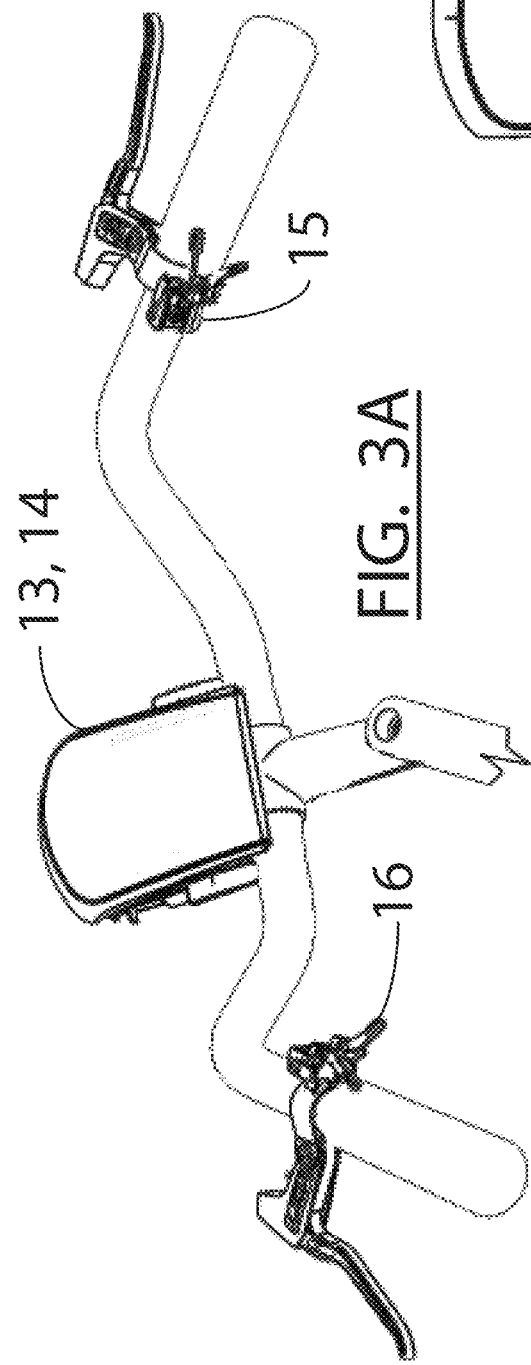
FIG. 3A is a view of the operator panel, switches and control system of the preferred embodiment of the automatic bicycle shifter and shifting cable actuator of the present invention.
Figure 3B:
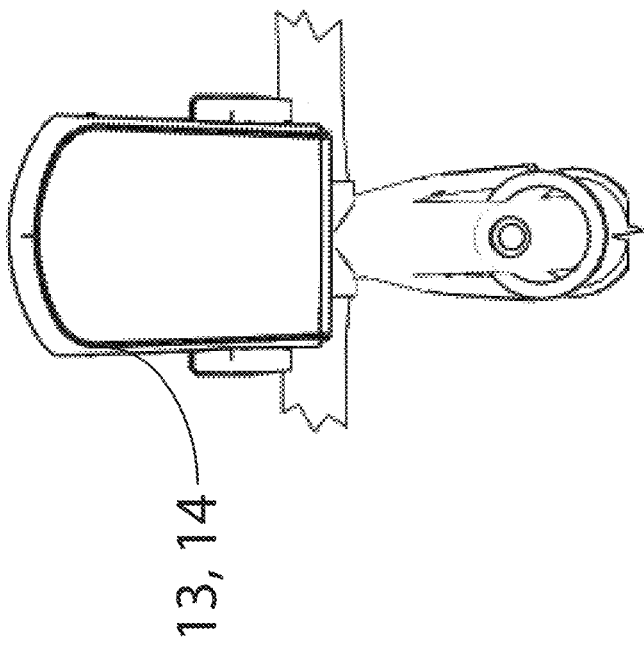
FIG. 3B is a closeup view of the operator panel and control system of the preferred embodiment of the automatic bicycle shifter and shifting cable actuator of the present invention.
Figure 3C:
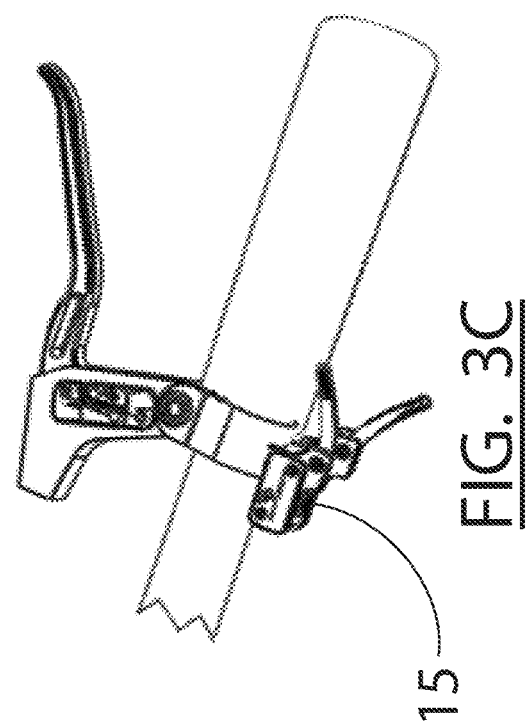
FIG. 3C is a closeup view of the right handlebar side located manual override switches of the preferred embodiment of the automatic bicycle shifter and shifting cable actuator of the present invention.
Figure 4:
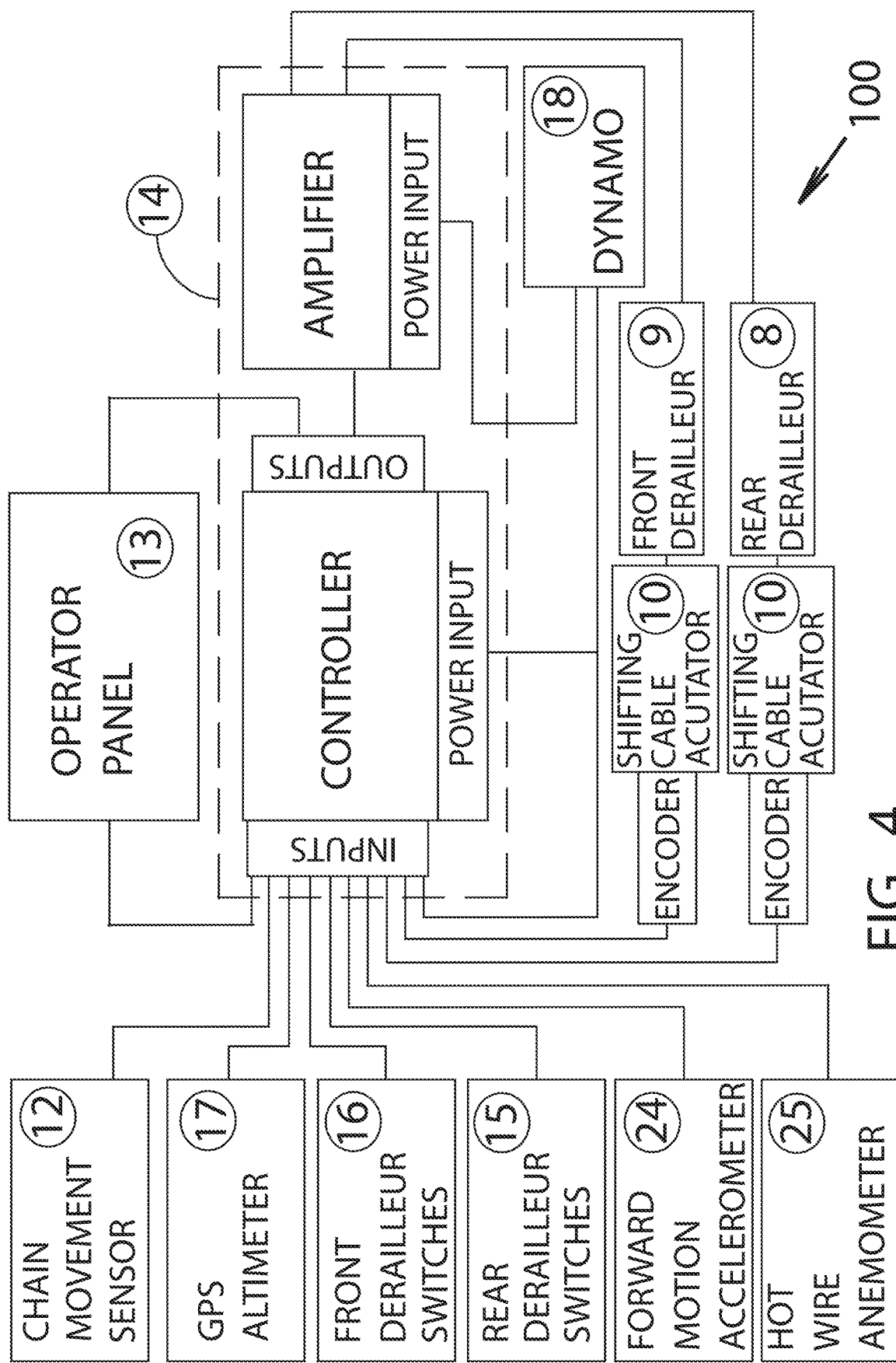
FIG. 4 is a block diagram of the control system and components of the preferred embodiment of the automatic bicycle shifter and shifting cable actuator of the present invention.

With reference to FIGS. 1-4, the preferred embodiment 100 of the automatic bicycle shifter and shifting cable actuator of the present invention comprises rear derailleur assembly 8 serving to alternate chain 19 between sprockets 20 of rear drive hub assembly 21, front derailleur assembly 9 serving to alternate chain 19 between front sprockets assembly 22 of front pedals assembly 23, shifting cable actuator 10 serving to actuate rear derailleur assembly 8 and front derailleur assembly 9 through sheathed actuation cable assemblies 11, chain movement sensor 12 serving to provide an "enable" signal for operation of and rear derailleur assemblies 8 and 9 respectively, operator panel 13, control system 14, rear derailleur manual shifting switches 15, front derailleur manual shifting switches 16, GPS Altimeter 17 and dynamo 18 serving as expended power replenishment means as well as bicycle speed sensing means, forward motion Accelerometer 24 serving to provide acceleration data to control system 14, and hot wire Anemometer 25 serving to provide wind speed data thereof. Partially shown wiring harness 26 serves to interconnect control system 14 to operator panel 13, manual switches 15 and 16, GPS Altimeter 17, front derailleur 9, dynamo 18, rear derailleur 8, chain movement sensor 12, forward motion Accelerometer 24, and hot wire Anemometer 25.

Applicant stresses that although forward motion Accelerometer 24 is being referred to as a hardware component undoubtedly comprising a best implementation thereof, a software solution based on differentiation of signal of dynamo 18 bicycle sensing means is also plausible and would thereby serve the same purpose. Therefore, the term "Accelerometer" 24 is being loosely used throughout this disclosure being either a hardware device producing a signal in known relationship to the change in speed of the bicycle or a software implementation of differentiation of the speed sensing means of the bicycle.

Applicant additionally stresses that although hot wire Anemometer 25 offers the best solution for a wind load measurements, other less costly devices based on a mechanical propeller means are available and could thereby serve the same purpose. Therefore, the term "hot wire Anemometer" 25 is also being loosely used throughout this disclosure with the term referring to an actual "how wire Anemometer" or a "wind speed sensing means".

Figure 5:
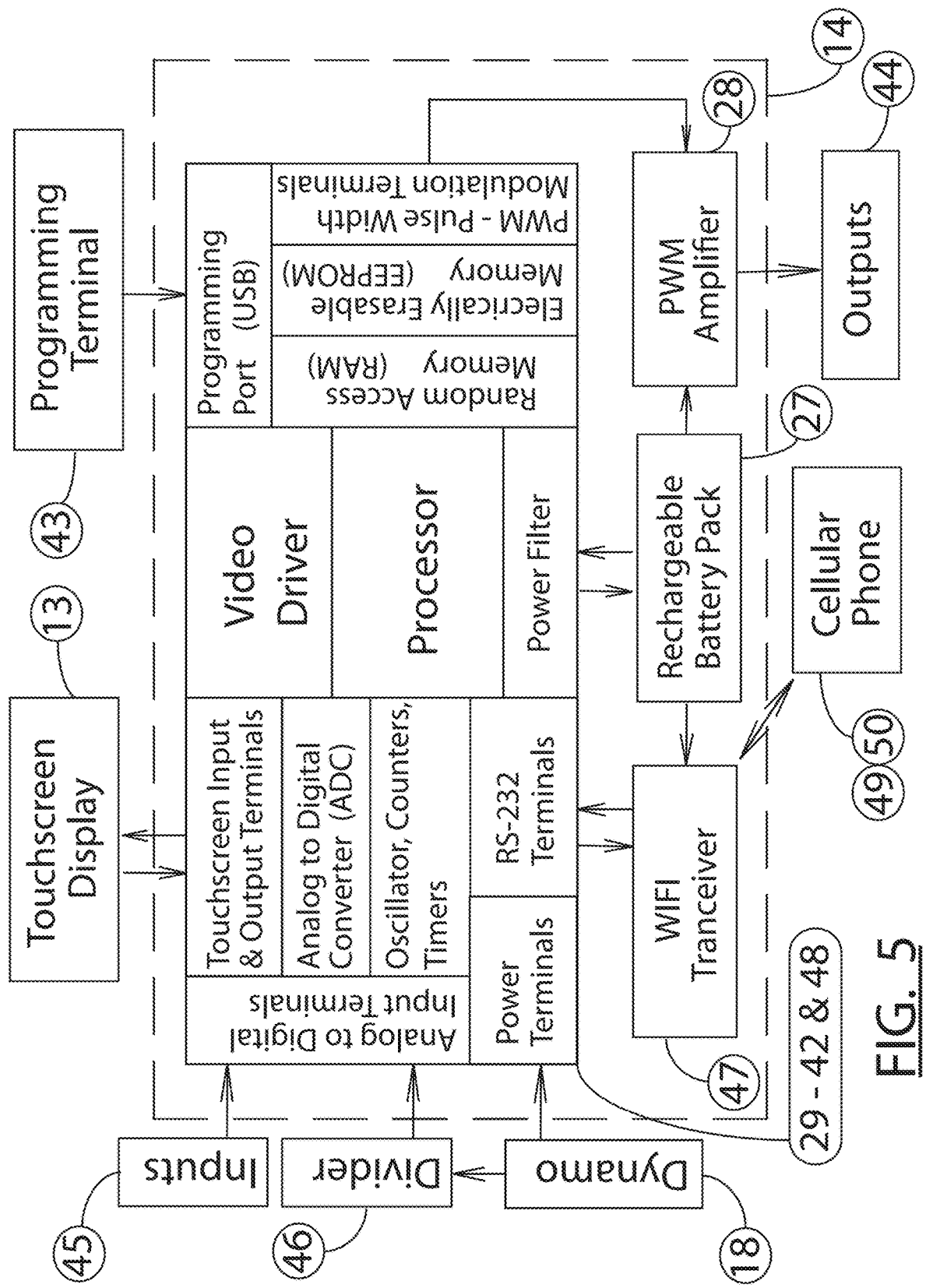
FIG. 5 is a block diagram of the controller of the preferred embodiment of the automatic bicycle shifter and shifting cable actuator of the present invention.
Figure 6:
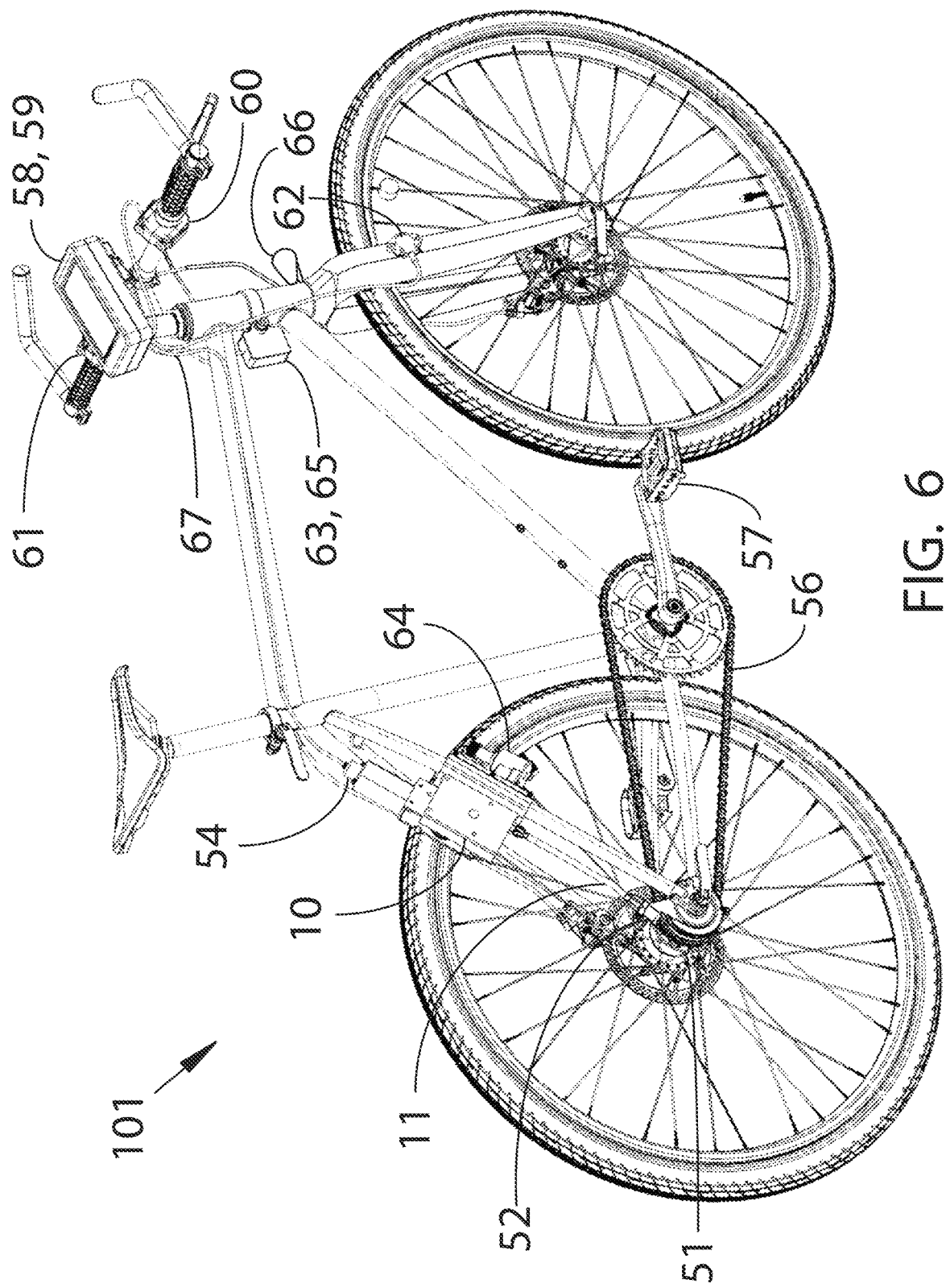
FIG. 6 is a perspective overall view of the systems and components comprising the first alternate embodiment of the automatic bicycle shifter and shifting cable actuator of the present invention.

Preferred Embodiment Controls—FIG. 5

With reference to FIG. 5, the preferred embodiment of the automatic bicycle shifter and shifting cable actuator of the present invention includes Control system 14 comprising steady power supply rechargeable battery pack 27, pulse width modulation (PWM) amplifier 28 and a controls section 29 comprising processor 30, video driver 31, random access memory (RAM) 32, oscillator/counters/timers subsection 33, analog to digital converter (ADC) subsection 34, and power filter 35, acting as an integral system serving to execute programming instructions received through universal serial (USB} programming port 36 and stored into electrically erasable programmable read only memory (EEPROM) 37 in order to control pulse width modulation (PWM) output terminals 38 in response to analog signals received through analog to digital (ADC) input terminals 39 and real time operator instructions from touchscreen display input terminals 40, display real time status through touchscreen display output terminals 41 with consumed power constantly being replenished through power terminals 42. Software updates to touchscreen display 13 and controls system 14 executed through programming terminal 43 are not limited to archiving existing user settings, downloading other users settings, installation of alternate user interfaces and patches geared to continually improve system performance of pulse width modulation (PWM) outputs 44 in response to inputs 45 of rear derailleur 8, front derailleur 9, chain movement sensor 12, rear derailleur manual shifting switches 15, front derailleur manual shifting switches 16, GPS Altimeter 17, Accelerometer 24, hot wire Anemometer 25, bicycle speed input signal received through dynamo voltage divider 46 and improved conservation of power received from power source dynamo 18. WIFI Transceiver 47 with bidirectional communication to control section 29 through RS-232 terminals 48 facilitates alternate control of the preferred embodiment of the automatic bicycle shifter and shifting cable actuator of the present invention through cellular phone 49 running a custom user interface and application communication software 50.

First Alternate Embodiment Construction—FIGS. 6-9

With reference to FIGS. 6-9, the first alternate embodiment 101 of the automatic bicycle shifter and shifting cable actuator of the present invention comprises geared rear hub 51 actuated through shifting cable coupling 52 slaved to shifting cable servo actuator 10 making use of position encoder 54 for controlled draw of sheathed pull cable assembly 11 thereby providing different available power transmission ratios of gear hub 51 through chain 56 to bicycle pedals assembly 57, touchscreen display 58, control system assembly 59, geared rear hub manual and override electric shifting switches 60, geared rear hub manual and automatic selection electric shifting switch 61, bicycle speed sensor 62, GPS Altimeter 63, dynamo 64 serving as controls system expended power replenishment means, forward motion Accelerometer 65 serving to provide acceleration data to control system 59, and hot wire Anemometer 66 serving to provide wind speed data to control system 59. Partially shown wiring harness 67 serves to interconnect touchscreen display 58 to control system assembly 59, manual electric shifting switches 60, manual and automatic electric selection switches 61, bicycle speed sensor 62, GPS Altimeter 63, dynamo 64, forward motion Accelerometer 65, hot wire Anemometer 66, shifting cable servo actuator 10 and encoder 54.

Applicant stresses again that although forward motion Accelerometer 65 is being referred to as a hardware component undoubtedly comprising a best implementation thereof, a software solution based on differentiation of signal of bicycle speed sensor 62 is also plausible and would thereby serve the same purpose. Therefore, the term "Accelerometer" 65 is being loosely used throughout this disclosure denoting either a hardware device producing a signal in known relationship to the change in speed of the bicycle or a software implementation of differentiation of the speed sensing means of the bicycle.

Applicant additionally stresses again that although hot wire Anemometer 66 offers the best solution for net wind speed measurement, other less costly devices based on a mechanical propeller means are available and thereby could serve the same purpose. Therefore, the term "hot wire Anemometer" 66 is also being loosely used throughout this disclosure with the term referring to an actual "how wire Anemometer" or a "wind speed sensing means".

Figure 7:
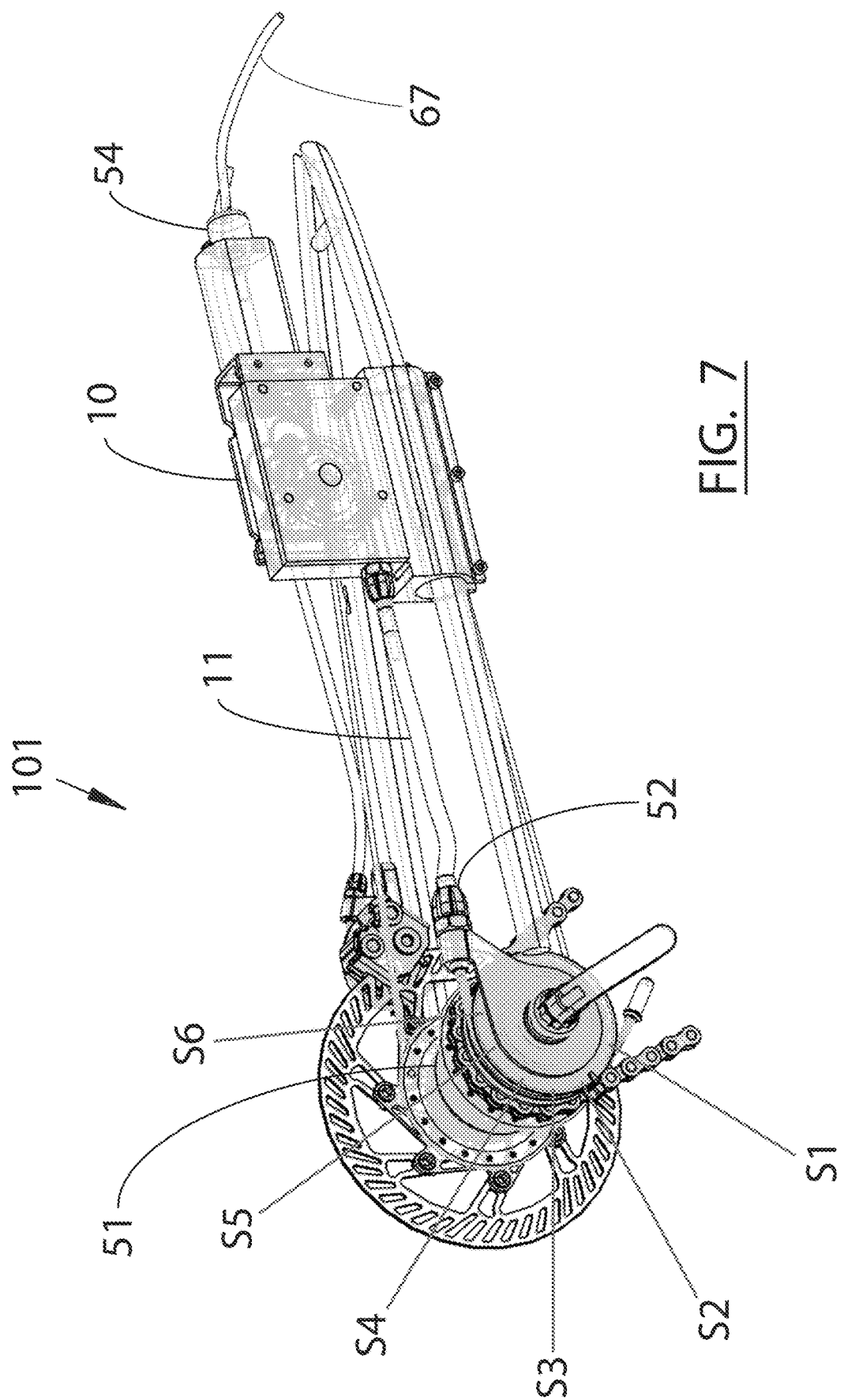
FIG. 7 is a perspective view of the novel shifting cable servo actuator apparatus of the first alternate embodiment of the automatic bicycle shifter and shifting cable actuator of the present invention connected to a common gearhub.
Figure 8:
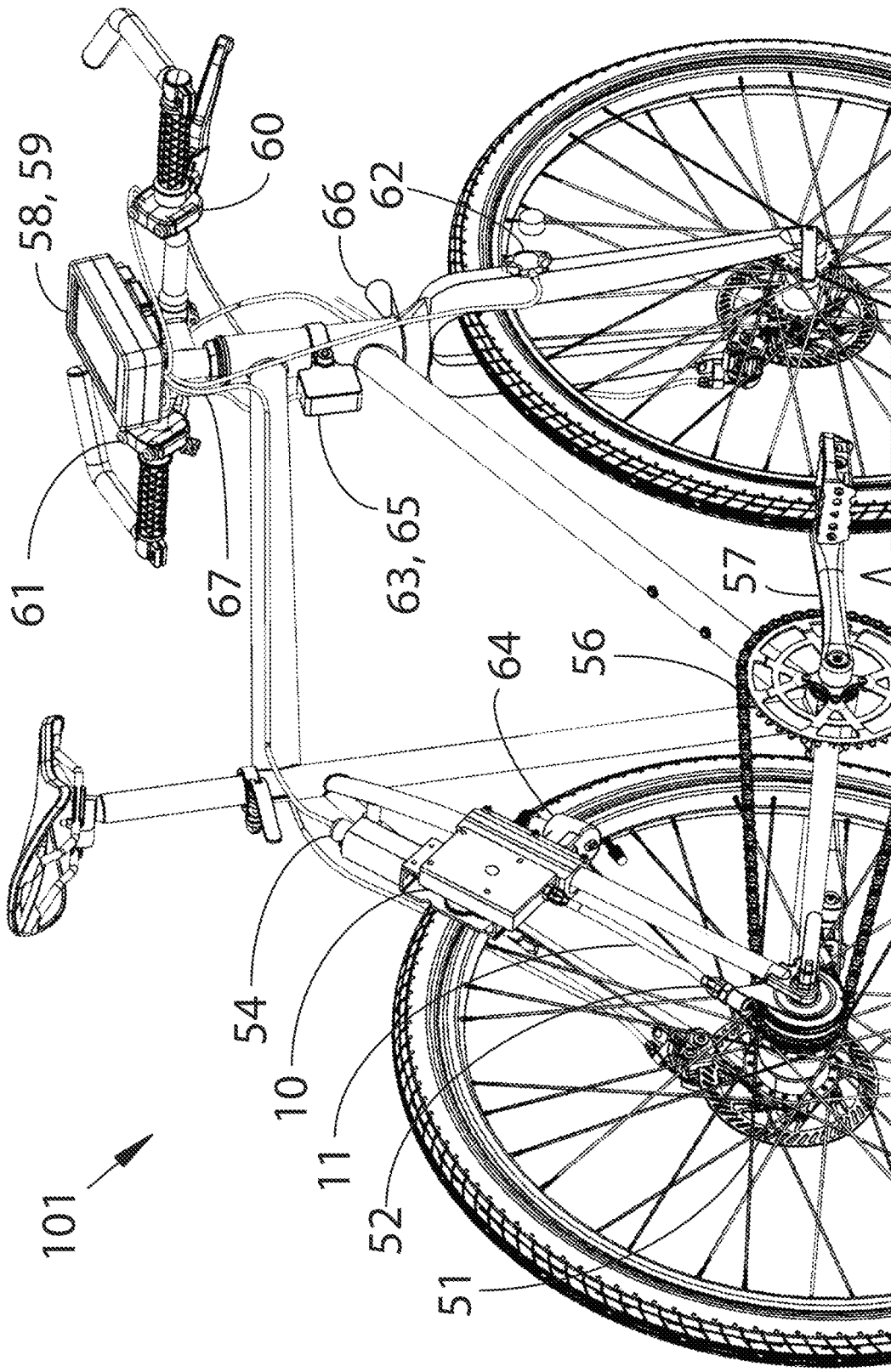
FIG. 8 is a closeup oblique view of the control components, actuation device, touchscreen display and override hardwired switches of the first alternate embodiment of the automatic bicycle shifter and shifting cable actuator of the present invention.

FIG. 7 depicts angular positions denoted S1 through S6 of shifter cable coupling 52 for geared rear hub 51 depicted in this illustration as a six speed hub. Applicant additionally stresses that no limit exists on the number of speeds geared rear hub 51 could alternately have due to shifting cable servo actuator 10 infinitesimal actuation capability with the only limitation being having sufficient travel to cover a smaller or larger actuation range thereof.

Figure 9:
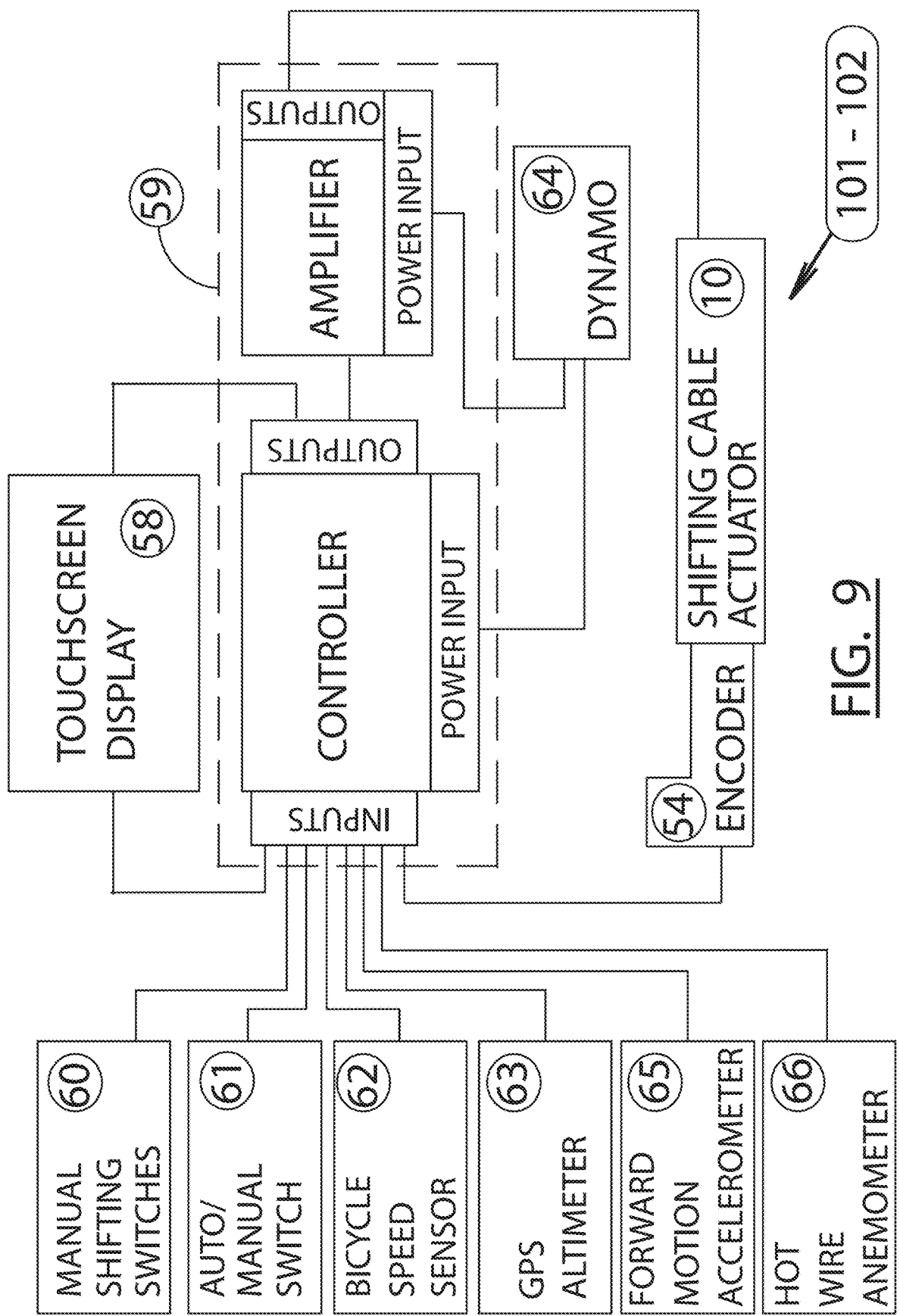
FIG. 9 is a block diagram of the control system and components of the alternate embodiments of the automatic bicycle shifter and shifting cable actuator of the present invention.
Figure 10:
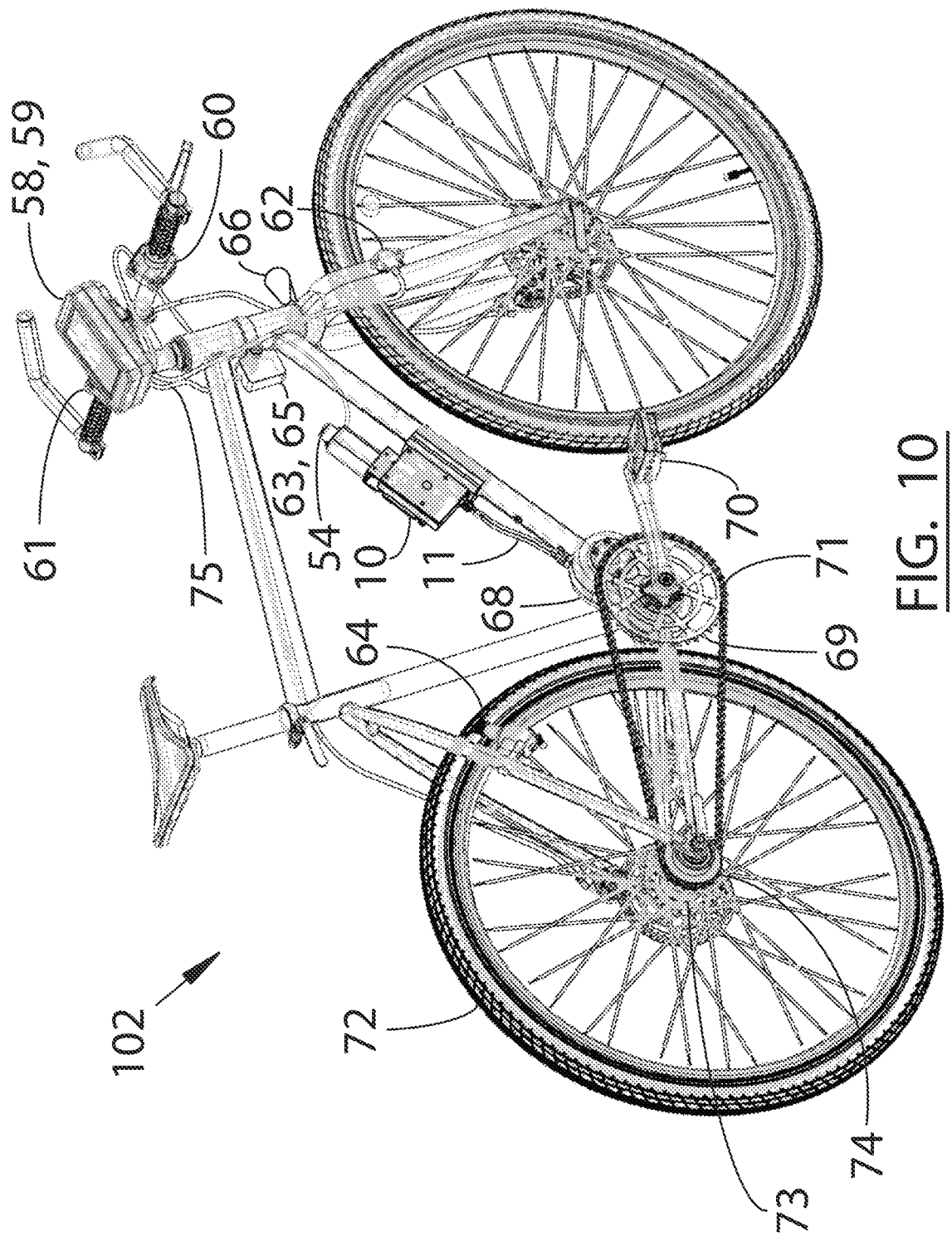
FIG. 10 is a perspective view of the second alternate embodiment of the automatic bicycle shifter and shifting cable actuator of the present invention.

Second Alternate Embodiment Construction—FIGS. 9 & 10

With reference to FIGS. 9 & 10, the second alternate embodiment 102 of the automatic bicycle shifter and shifting cable actuator of the present invention comprises bicycle pedals energized gearbox 68 serving to actuate at different ratios drive chain sprocket 69 slip fit to bicycle pedals assembly 70 and permanently engaging bicycle drive chain 71 serving to energize rear bicycle wheel 72 through freewheel hub 73 through forward ratcheting sprocket assembly 74 with gearbox 68 slaved to shifting cable servo actuator 10 making use of position encoder 54 for controlled draw of sheathed pull cable assembly 11 serving to shift gearing of gearbox 68 thereby facilitating different available power transmission drive ratios between bicycle pedals assembly 70 and drive chain sprocket 69 per rider instructions issued through touchscreen display 58, gearbox manual override electric shifting switches 60, gearbox manual and automatic electric selection switch 61, and processed by control system assembly 59 along with additional data received from bicycle speed sensor 62, GPS Altimeter 63, forward motion Accelerometer 65, and hot wire Anemometer 66, with dynamo 64 serving as controls system expended power replenishment means. Partially shown wiring harness 75 serves to interconnect control system assembly 59 to touchscreen display 58, manual electric shifting switches 60, manual and automatic electric selection switch 61, bicycle speed sensor 62, GPS Altimeter 63, forward motion Accelerometer 65, dynamo 64, hot wire Anemometer 66, shifting cable servo actuator 10 and encoder 54.

Figure 11:
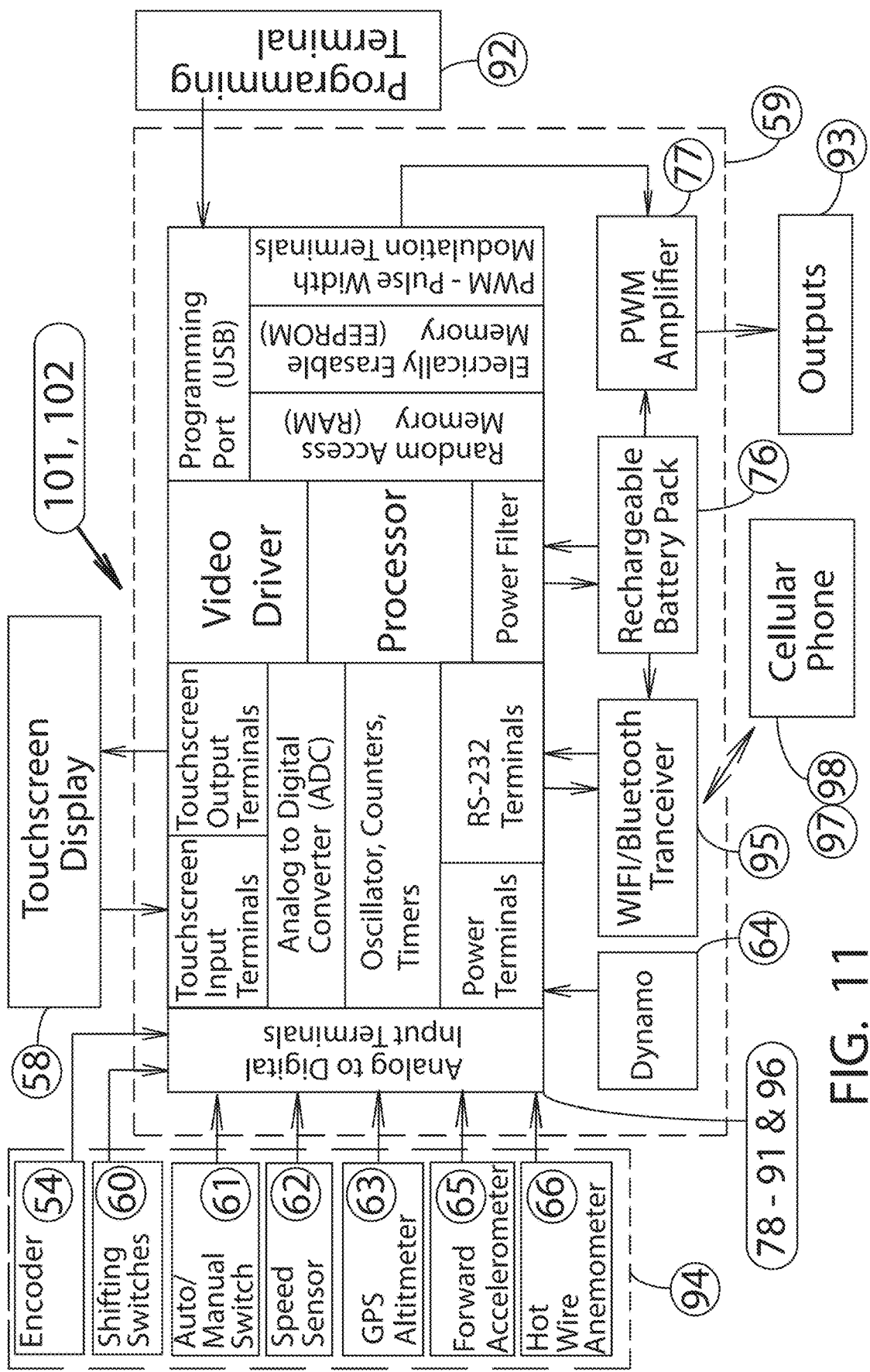
FIG. 11 is a block diagram of the controller of the alternate embodiments of the automatic bicycle shifter and shifting cable actuator of the present invention.

Alternate Embodiment Controls—FIG. 11

With reference to FIG. 11, the alternate embodiments of the automatic bicycle shifter and shifting cable actuator of the present invention include Control system assembly 59 comprising steady power supply rechargeable battery pack 76, pulse width modulation (PWM) amplifier 77 and a controls section 78 comprising processor 79, video driver 80, random access memory (RAM) 81, oscillator/counters/timers subsection 82, analog to digital converter (ADC) subsection 83, and power filter 84, acting as an integral system serving to execute programming instructions received through universal serial (USB} programming port 85 and stored into electrically erasable programmable read only memory (EEPROM) 86 in order to control pulse width modulation (PWM) output terminals 87 in response to analog signals received through analog to digital (ADC) input terminals 88 and real time operator instructions from touchscreen display input terminals 89, display real time status through touchscreen display output terminals 90 with consumed power constantly being replenished through power terminals 91. Software updates to controls system 59 and touchscreen display 58 executed through programming terminal 92 are not limited to archiving existing user settings, downloading other users settings, installation of alternate user interfaces and patches geared to continually improve system performance of pulse width modulation (PWM) outputs 93 in response to inputs 94 received from gearbox manual and override electric shifting switches 60, gearbox manual and automatic electric selection switch 61, bicycle speed sensor 62, encoder 54, GPS Altimeter 63, forward motion Accelerometer 65, hot wire Anemometer 66, and improved conservation of power received from power source dynamo 64. WIFI/Bluetooth Transceiver 95 with bidirectional communication to control section 78 through RS-232 terminals 96 facilitates alternate control of the alternate embodiments 101 & 102 of the automatic bicycle shifter and shifting cable actuator of the present invention through cellular phone 97 running a custom user interface and application communication software 98.

Preferred and Alternate Embodiments Shifting Cable Servo Actuator—FIGS. 12A-12C With reference to FIGS. 12A-12C, the preferred embodiment of the shifting cable servo actuator 10 of alternate embodiments 101 and 102 of the automatic bicycle shifter and shifting cable actuator of the present invention comprises housing 120 with collapsing cylindrical portion 121 serving to affix housing 120 to bicycle frame (not shown) by screws 122, cylindrical cavity 123 and slip fitting cable pulley 124 rotationally operable thereof, concentric through bore 125 thereof slip fitting bearing 126 of gearmotor 127, and through holes 128 slip fitting gearmotor fastening screws 129 serving to secure gearmotor 127 to housing 120 by means of cover 130 through cover tapped holes 131. Housing 120 further includes tapped bore 132 for attachment of cable tensioning fitting 133 for tensioning of actuation cable 134 of sheathed cable assembly 11 thereof by means of tensioning nut 135 and inline through passage 136 for actuation cable 134 of sheathed cable assembly 11 into housing cylindrical cavity 123. Gearmotor 127 comprises electric motor 137, with free armature end affixed to encoder 54 and actuation end affixed to worm 138 acting through worm gear 139 of quadruple reduction gearing 140 disposed within housing 141, serves to actuate output shaft 142 with keyslot 143 tightly fitting key 144 for positive rotation actuation of cable pulley 124 through keyslot 145 thereof also accurately fitting key 144. Cable pulley 124 further includes circular cable groove 146 slip fitting actuation cable 134 rotationally retained thereto by means of screw 147 and clamp 148 through side window 149. Encoder 54 permits controlled actuation of motor 137 acting through worm 138 and worm gear 139 of quadruple reduction gearing 140 in turn energizing output shaft 142 which through key 144 serves to rotationally actuate cable pulley 124 thereby facilitating forward and reverse actuation of actuation cable 134 depending on direction of rotation of armature of motor 137. Selection of a proper reduction ratio of worm 138 and worm gear 139 permits inhibiting reverse actuation of this gearset resulting in sole possible actuation being that of worm gear 139 through worm 138 through motor 137 and thereby any motion of shaft 142 being solely contingent upon actuation of motor 137. In other words, shaft 142 and by extension cable pulley 124 and consequently actuation cable 134 will hold actuated position regardless of extraneous forces thereby permitting holding of shift position of actuated device notwithstanding any tension forces applied to shifting cable servo actuator 10 through actuation cable 134 for as long as motor 137 holds position.

Applicant additionally stresses that although the disclosed device makes use servo motor acting through a quadruple reduction gearset, other gearbox ratios and actuation devices such as stepping or microstepping electrical motors capable of holding commanded positions would also serve the same purpose. Therefore, gearbox 127 is additionally being loosely used throughout this disclosure denoting a servo motor acting through an multi speed gearbox or a stepping or microstepping motor with output shaft thereof directly affixed to pulley 124. Alternately, motor 137, although disclosed as a servo motor with encoder 54, a stepper motor with or without an encoder could fulfill the same purpose.

Preferred and Alternate Embodiments Double Shifting Cable Servo Actuator—FIGS. 13A-13C With reference to FIGS. 13A-13C, the preferred embodiment of the double shifting cable servo actuator 150 alternately employed by the preferred and alternate embodiments of the automatic bicycle shifter and shifting cable actuator of the present invention, depending on powertrain design thereof, is predominantly similar in construction to shifting cable servo actuator 10 with actuation cable 134 further extending from opposite end of cable pulley 124 through housing 151, an exact replica of housing 120 of servo actuator 10 with additional passage 152 for actuation cable 134 of sheathed cable assembly 150, tapped bore 153 and thereto mounted cable tensioning fitting 154 for tensioning of actuation cable 134 by means of tensioning nut 155 and finally extending through sheathed cable assembly 150 to actuated device. As shifting cable 134 is affixed to cable pulley 124, any rotational motion thereof results in a linear motion of actuation cable 134 extending from tensioning fitting 133 in one direction and an equal linear motion of actuation cable 134 extending from tensioning fitting 154 in the opposite direction. This type of push/pull shifting cable arrangement is geared toward certain gearhub and bicycle transmission devices relying a double cable arrangement to alleviate reliance on springs to keep actuation cable taught. This disclosure further stresses that aside from the double cable arrangement of double shifting cable servo actuator 150, all construction provisions thereof are a mere duplication of those of shifting cable servo actuator 10.

Applicant stresses again that although the disclosed device makes use servo motor acting through a quadruple reduction gearset, other gearbox ratios and actuation devices such as stepping or microstepping electrical motors capable of holding commanded positions would also serve the same purpose. Therefore, gearbox 127 is additionally being loosely used throughout this disclosure denoting a servo motor acting through an multi speed gearbox or a stepping or microstepping motor with output shaft thereof directly affixed to pulley 124.

The invention claimed is:
1. a bicycle shifting cable actuator comprising:
a) a housing including a main cylindrical cavity and a rotationally operable cable pulley disposed in the main cylindrical cavity,
b) said housing including a second cylindrical cavity concentric to said main cylindrical cavity, the second cylindrical cavity configured to receive a shaft of a gearmotor secured to said housing,
c) said shaft of said gearmotor extending into said main cylindrical cavity and into a bore of said cable pulley, the bore being concentric with the main cylindrical cavity,
d) said shaft and said cable pulley comprising matching keyslots for receiving a matching key to rotationally couple the shaft and the cable pulley,
e) said housing further including a cylindrical passage tangential to said main cylindrical cavity and configured to receive an actuation cable of a sheathed cable assembly and a tapped bore, concentric with the cylindrical passage, configured to receive a fitting for receiving said sheathed cable assembly, f) said cable pulley further including a cable clamp and a fastening screw for positive retention of said actuation cable, g) wherein energization of said gearmotor actuates said actuation cable through actuation of said cable pulley.

2. The bicycle shifting cable actuator of claim 1 wherein said gearmotor further includes a position encoder.

3. The bicycle shifting cable actuator of claim 1 wherein said gearmotor further includes a worm gearset for positive retention of rotational position of said shaft, said cable pulley and said actuation cable.

4. The bicycle shifting cable actuator of claim 1 wherein said housing further includes a collapsing cylindrical portion extending from said housing in a perpendicular direction to said main cylindrical cavity and including a longitudinal opening and thereto parallel protruding rectangular extensions including screw holes for mounting to a bicycle frame.

5. The bicycle shifting cable actuator of claim 1 wherein said housing further includes through holes for receiving mounting screws for said gearmotor, the mounting screws extending through said housing and into tapped holes of a thereto mounted protective cover.

6. The bicycle shifting cable actuator of claim 1 wherein said fitting for receiving said sheathed cable assembly includes a thread body portion for adjustment of said actuation cable and a locknut for securing said fitting in an adjusted position.

7. The bicycle shifting cable actuator of claim 1 wherein said cable pulley further includes a side window, the cable clamp and the fastening screw are exposed through the side window.

8. The bicycle shifting cable actuator of claim 1 wherein said gearmotor is a stepper motor.

9. a bicycle shifting cable actuator comprising,
   a) a housing including a main cylindrical cavity and a rotationally operable cable pulley disposed in the main cylindrical cavity,
   b) said housing including a second cylindrical cavity concentric to said main cylindrical cavity, the second cylindrical cavity configured to receive a shaft of a gearmotor secured to said housing,
   c) said shaft of said gearmotor extending into said main cylindrical cavity and into a bore of said cable pulley, the bore being concentric with the main cylindrical cavity,
   d) said shaft and said cable pulley comprising matching keyslots for receiving a matching key to rotationally couple the shaft and the cable pulley,
   e) said housing further including a pair of parallel cylindrical passages tangential to said main cylindrical cavity, the pair of parallel cylindrical passages configured to receive an actuation cable of a pair of sheathed cable assemblies and a pair of tapped bores, concentric with the pair of parallel cylindrical passages, configured to receive fittings for receiving said sheathed cable assemblies,
   f) said cable pulley further including a cable clamp and a fastening screw for positive retention of said actuation cable,
   g) wherein energization of said gearmotor actuates said actuation cable in opposite directions through actuation of said cable pulley.

10. The bicycle shifting cable actuator of claim 9 wherein said gearmotor further includes a position encoder.

11. The bicycle shifting cable actuator of claim 9 wherein said gearmotor further includes a worm gearset.

12. The bicycle shifting cable actuator of claim 9 wherein said housing further includes a collapsing cylindrical portion extending from said housing in a perpendicular direction to said main cylindrical cavity and including a longitudinal opening and thereto parallel protruding rectangular extensions including screw holes for mounting to a bicycle frame.

13. The bicycle shifting cable actuator of claim 9 wherein said housing further includes through holes for receiving mounting screws for said gearmotor, the mounting screws extending through said housing and into tapped holes of a thereto mounted protective cover.

14. The bicycle shifting cable actuator of claim 9 wherein said fittings for receiving said sheathed cable assemblies include threaded body portions for adjustment of said actuation cable and a pair of locknuts for securing said fittings in adjusted positions.

15. The bicycle shifting cable actuator of claim 9 wherein said cable pulley further includes a side window, the cable clamp and the fastening screw are exposed through the side window.

16. The bicycle shifting cable actuator of claim 9 wherein said gearmotor is a stepper motor.

17. A process of actuation of a bicycle shifting cable comprising:
   a) providing a housing with a main cylindrical cavity and rotationally operable cable pulley disposed in the main cylindrical cavity,
   b) providing said housing with a second cylindrical cavity concentric to said main cylindrical cavity, the second cylindrical cavity configured to receive a bearing of an output shaft of a gearmotor mounted to said housing,
   c) providing said output shaft of said gearmotor with an extension through said bearing and through a matching concentric bore of said cable pulley, and the output shaft and the cable pulley are rotationally coupled,
   d) providing said housing with a cylindrical passage tangential to said main cylindrical cavity and configured to receive of an actuation cable of a sheathed cable assembly and a tapped bore, concentric with the cylindrical passage, configured to receive a fitting for receiving said sheathed cable assembly,
   e) additionally providing said cable pulley attached to said actuation cable,
   g) wherein energization of said gearmotor actuates said actuation cable through actuation of said cable pulley.

18. A process of actuation of a bicycle shifting cable comprising:
   a) providing a housing with a main cylindrical cavity and a rotationally operable cable pulley disposed in the main cylindrical cavity,
   b) providing said housing with a second cylindrical cavity concentric to said main cylindrical cavity, the second cylindrical cavity configured to receive a bearing of an output shaft of a gearmotor mounted to said housing,
   c) providing said output shaft of said gearmotor with an extension through said bearing and through a matching concentric bore of said cable pulley, and the output shaft and the cable pulley are rotationally coupled,
   d) additionally providing said housing with a pair of parallel cylindrical passages tangential to said main cylindrical cavity and and configured to receive an actuation cable extending through both of said pair of parallel cylindrical passages and through a pair of sheathed cable assemblies and tapped bores configured to receive of a pair of fittings for receiving said sheathed cable assemblies, e) additionally providing said cable pulley attached to said actuation cable,
g) wherein energization of said gearmotor actuates said actuation cable in opposite directions through actuation of said cable pulley.

\* \* \* \* \*